United States Patent
Kim et al.

(10) Patent No.: US 9,043,377 B2
(45) Date of Patent: May 26, 2015

(54) MONTGOMERY INVERSE CALCULATION DEVICE AND METHOD OF CALCULATING MONTGOMERY INVERSE USING THE SAME

(75) Inventors: Young Sik Kim, Hwaseong-si (KR); Kyoung Moon Ahn, Seoul (KR); Jong Hoon Shin, Hwaseong-si (KR); Sun-Soo Shin, Seoul (KR); Ji-Su Kang, Seoul (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 548 days.

(21) Appl. No.: 13/361,329

(22) Filed: Jan. 30, 2012

(65) Prior Publication Data

US 2012/0197953 A1    Aug. 2, 2012

(30) Foreign Application Priority Data

Jan. 31, 2011    (KR) .................. 10-2011-0009584

(51) Int. Cl.
| | |
|---|---|
| *G06F 7/38* | (2006.01) |
| *G06F 5/01* | (2006.01) |
| *G06F 7/72* | (2006.01) |
| *G06F 7/48* | (2006.01) |
| *G06F 7/52* | (2006.01) |
| *G06F 7/544* | (2006.01) |

(52) U.S. Cl.
CPC ...... *G06F 5/01* (2013.01); *G06F 7/728* (2013.01); *G06F 7/48* (2013.01); *G06F 7/52* (2013.01); *G06F 7/544* (2013.01)

(58) Field of Classification Search
CPC .......... G06F 7/721; G06F 7/726; G06F 7/728
USPC .................................... 708/491, 492
See application file for complete search history.

(56) References Cited

U.S. PATENT DOCUMENTS

| | | | |
|---|---|---|---|
| 6,088,453 | A | 7/2000 | Shimbo |
| 7,050,579 | B1 | 5/2006 | Koc et al. |
| 2005/0041811 | A1* | 2/2005 | Kobayashi et al. ........... 380/255 |
| 2005/0283514 | A1* | 12/2005 | McIvor et al. ............... 708/491 |
| 2008/0219437 | A1 | 9/2008 | Ebeid |

FOREIGN PATENT DOCUMENTS

JP    2004-205870    7/2004

* cited by examiner

*Primary Examiner* — Chuong D Ngo
(74) *Attorney, Agent, or Firm* — Ellsworth IP Group PLLC

(57) ABSTRACT

A Montgomery inverse calculation device includes a plurality of registers each storing a value of a variable, a modulus register storing a modulus, a multiplier performing multiplication on the modulus. A comparator compares the value of the variable stored in each of the registers with an output value of the multiplier and generates a plurality of control signals. A plurality of shifters shifts bits of a value of a variable stored in a corresponding register among the registers in response to at least one first control signal, and a quotient generation block calculates a quotient of mod 2m with respect to values output from some of the shifters in response to a second control signal. A calculation block calculates an updated value of an output value of each of the shifters using the quotient in response to at least one third control signal.

6 Claims, 4 Drawing Sheets

MONTGOMERY INVERSE CALCULATION DEVICE AND METHOD OF CALCULATING MONTGOMERY INVERSE USING THE SAME

CROSS-REFERENCE TO RELATED APPLICATIONS

This application claims priority under 35 U.S.C. §119(a) from Korean Patent Application No. 10-2011-0009584 filed on Jan. 31, 2011, the disclosure of which is hereby incorporated by reference in its entirety.

BACKGROUND

1. Field of the General Inventive Concept

The present general inventive concept relates to a Montgomery inverse calculation device, and more particularly, to a Montgomery inverse calculation device to improve modular reduction on a plurality of bits, and method of calculating a Montgomery inverse using the same.

2. Description of the Related Art

When an integer A and an odd number P, which are co-prime, are given, X that satisfies Equation 1 with respect to an integer "k" is referred to as a Montgomery inverse:

$$A*X = 2^k \bmod P. \quad (1)$$

The Montgomery inverse is used in many cryptosystems. At this time, the shorter it takes to calculate the Montgomery inverse, the faster the cryptosystems perform encryption and decryption algorithms.

SUMMARY

According to some exemplary embodiments of the present general inventive concept, there is provided a Montgomery inverse calculation device including a plurality of registers each configured to store a value of a variable, a modulus register configured to store a modulus, a multiplier configured to perform multiplication on the modulus, a comparator configured to compare the value of the variable stored in each of the registers with an output value of the multiplier and to generate a plurality of control signals, a plurality of shifters each configured to shift bits of a value of a variable stored in a corresponding register among the registers in response to at least one first control signal among the control signals, a quotient generation block configured to calculate a quotient of mod $2^m$ with respect to values output from some of the shifters in response to a second control signal among the control signals where "m" is 2 or a natural number greater than 2, and a calculation block configured to calculate an updated value of an output value of each of the shifters using the quotient in response to at least one third control signal among the control signals.

Additional features and utilities of the present general inventive concept will be set forth in part in the description which follows and, in part, will be obvious from the description, or may be learned by practice of the general inventive concept.

The quotient generation block may include an inverse calculator configured to calculate an inverse of mod $2^m$ in response to the second control signal and a quotient generator configured to calculate the quotient using the inverse of mod $2^m$. Each of the shifters may perform a shift by at least one bit.

The calculation block may perform modular reduction on at least one value among output values of the respective shifters.

The Montgomery inverse calculation device may further include a plurality of selectors each configured to output an output value of a corresponding shifter among the shifters or an output value of the calculation block to a corresponding register among the registers.

According to other exemplary embodiments of the present general inventive concept, there is provided a method of calculating a Montgomery inverse using a Montgomery inverse calculation device. The method includes storing a value of each of variables used in calculating the Montgomery inverse in a corresponding register among a plurality of registers and a modulus in a modulus register; calculating an inverse $A^{-1}2^k \bmod P$ of A with respect to an integer "k"; and correcting the integer "k" used as an exponent of the inverse and calculating a Montgomery inverse $A^{-1}2^{2n} \bmod P$ of A. Here, A may be an integer, P may be an odd number, A and P may be co-prime, "k" may be a bit which is currently subjected to the calculation of the inverse of A, and "n" may be the number of bits of P expressed in binary notation. The operation of calculating the inverse of A with respect to the integer "k" may use a multi-bit operation.

In another exemplary embodiment of the present general inventive concept, a Montgomery inverse calculation device to output a signal indicating an Montgomery inverse includes a plurality of registers, each register to store input data and to generate a respective input signal indicating input data stored the respective register, a modulus register to store modulus data indicative of a modulus and to generate a modulus signal indicating modulus data stored therein, a calculation block to receive the input signal from each register and the modulus signal and to update the input data stored in a first plurality of registers among the plurality of registers based on the modulus data, and an inversion module to receive the updated input data of the first plurality of registers and to receive an input "A" corresponding to an integer of an initial inverse $A*X=2^k \bmod P$, to invert the input "A" based on the updated input data of the first plurality of registers, and to generate an inversion signal (A−1) indicating an inversion of the input "A".

BRIEF DESCRIPTION OF THE DRAWINGS

These and/or other features and utilities of the present general inventive concept will become apparent and more readily appreciated from the following description of the exemplary embodiments, taken in conjunction with the accompanying drawings of which.

DETAILED DESCRIPTION OF THE EXEMPLARY EMBODIMENTS

Figure 1:
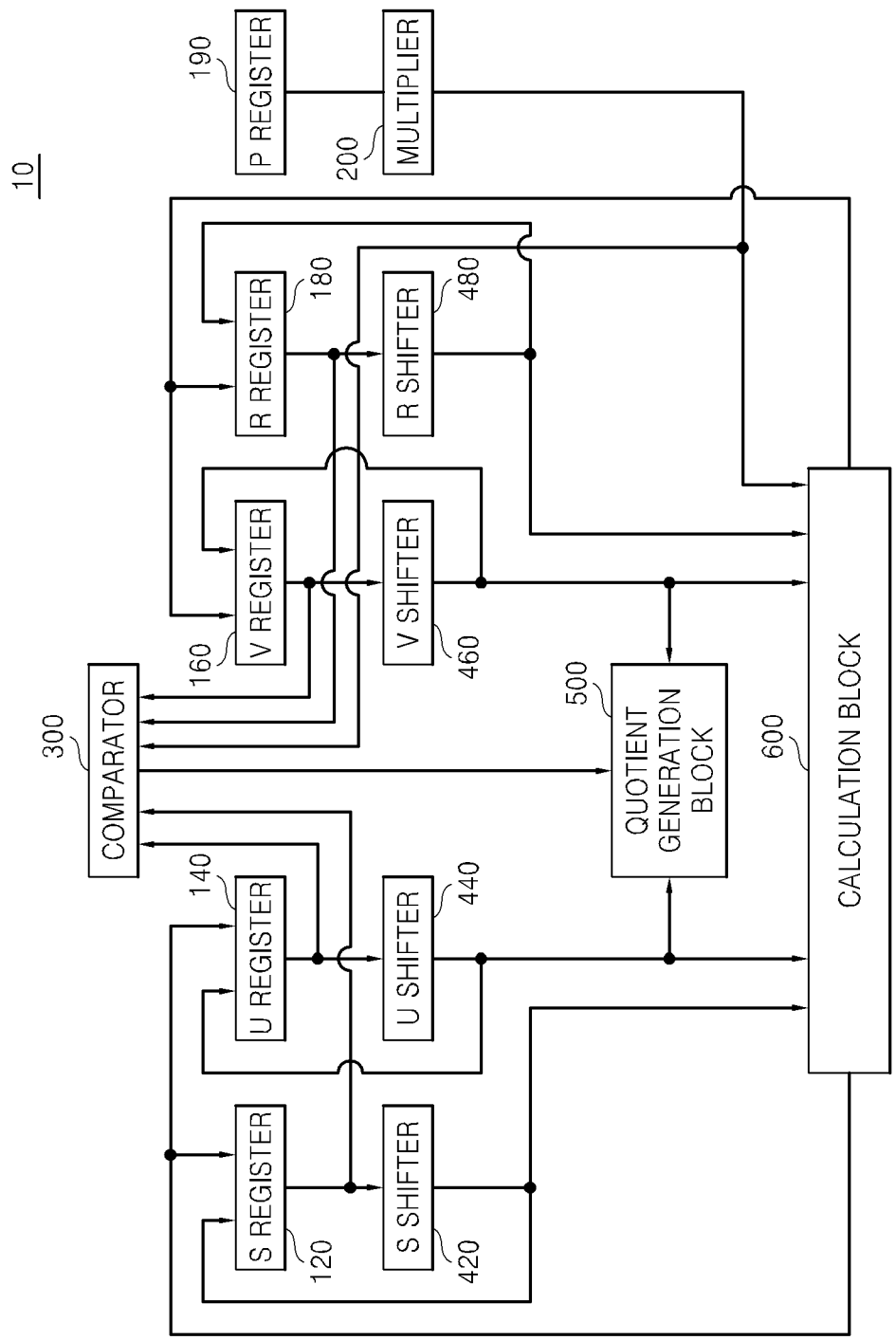
FIG. 1 is a block diagram of a Montgomery inverse calculation device according to an exemplary some embodiment.

Reference will now be made in detail to the exemplary embodiments of the present general inventive concept, examples of which are illustrated in the accompanying drawings, wherein like reference numerals refer to the like elements throughout. The exemplary embodiments are described below in order to explain the present general inventive concept while referring to the figures.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular exemplary embodiments only and is not intended to be limiting. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which the exemplary embodiments belong. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of a Montgomery inverse calculation device 10 according to an exemplary embodiment. Referring to FIG. 1, the Montgomery inverse calculation device 10 includes a plurality of registers 120, 140, 160, and 180, a modulus register 190, a multiplier 200, a comparator 300, a plurality of shifters 420, 440, 460, and 480, a quotient generation block 500 and a calculation block 600.

Each of the registers 120, 140, 160, and 180 may store a value of a corresponding one of a plurality of variables S, U, V, and R used in calculating a Montgomery inverse. The registers 120, 140, 160, and 180 may also respectively store updated values of the respective variables S, U, V, and R. For example, the variables S, U, V and R may be input values input to the Montgomery inverse calculation device 10 using an input unit (not shown). The variables S, U, V and R may also be predetermined and/or calculated values stored in an external memory unit (not shown) and received by the Montgomery inverse calculation device 10.

The registers 120, 140, 160, and 180 include an S register 120 storing the value of the variable S, an U register 140 storing the value of the variable U, a V register 160 storing the value of the variable V, and an R register 180 storing the value of the variable R. The variable's value stored in each of the registers 120, 140, 160, and 180 is output to a corresponding one of the shifters 420, 440, 460, and 480, as discussed further below.

The modulus register 190 may store a modulus P. The modulus P may be an input value input to the Montgomery inverse calculation device 10 using an input unit (not shown). The modulus P may also be a predetermined and/or calculated value stored in an external memory unit (not shown) and received by the Montgomery inverse calculation device 10. The multiplier 200 may perform multiplication of the modulus P. In detail, the multiplier 200 may calculate t*P (where "t" is an integer) using an output value of the modulus register 190. The comparator 300 may compare the variable's value stored in each of the registers 120, 140, 160, and 180 with an output value of the multiplier 200 and generate a plurality of control signals.

Each of the shifters 420, 440, 460, and 480 may shift right or left bits of the variable's value stored in a corresponding one of the registers 120, 140, 160, and 180 in response to at least one first control signal among the plurality of control signals output from the comparator 300. Each of the shifters 420, 440, 460, and 480 may shift the bits of the variable's value by at least one bit. The at least one first control signal include information about the number of bits that will be shifted by each of the shifters 420, 440, 460, and 480.

The shifters 420, 440, 460, and 480 include an S shifter 420 shifting the bits of the value of the variable S, an U shifter 440 shifting the bits of the value of the variable U, a V shifter 460 shifting the bits of the value of the variable V, and an R shifter 480 shifting the bits of the value of the variable R.

The quotient generation block 500 may calculate a quotient "q" of "mod $2^m$" where the modulus "P" is "$2^m$", with respect to values output from at least one of the shifters 420, 440, 460, and 480. The quotient "q" may be generated in response to receiving at least one of the output values from the shifters 420, 440, 460 and 480. The quotient generation block 500 may also calculate the quotient "q" in response to a second control signal. The second control signal may be included among the plurality of control signals generated by the comparator 300, and/or from another control module. Here, "m" is 2 or a natural number greater than 2.

The calculation block 600 may calculate an updated value of an output value of each of the shifters 420, 440, 460, and 480 using the quotient "q" in response to another control signal i.e., at least one third control signal, among the plurality of control signals.

The calculation block 600 may also perform modular reduction on at least one of the output values of the shifters 420, 440, 460, and 480. For instance, the calculation block 600 may perform modular reduction on the output value of the S shifter 420 and the output value of the R shifter 480.

Figure 2:
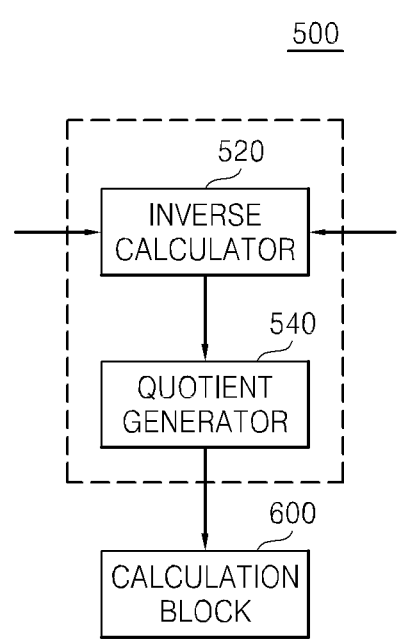
FIG. 2 is a block diagram of a quotient generation block illustrated in FIG. 1.

FIG. 2 is a block diagram of the quotient generation block 500 illustrated in FIG. 1. Referring to FIG. 2, the quotient generation block 500 includes an inverse calculator 520 and a quotient generator 540.

The inverse calculator 520 may calculate an inverse of mod $2^m$ with respect to the values output from some of the shifters 420, 440, 460, and 480 in response to the second control signal among the plurality of control signals. For instance, the inverse calculator 520 may calculate an inverse of the output value of the U shifter 440 or an inverse of the output value of the V shifter 460 in response to the second control signal. In other words, the inverse calculator 520 may obtain an inverse ($U^{-1}$) of the variable U or an inverse ($V^{-1}$) of the variable V. The quotient generator 540 may calculate the quotient "q" using the inverse of the mod $2^m$.

Figure 3:
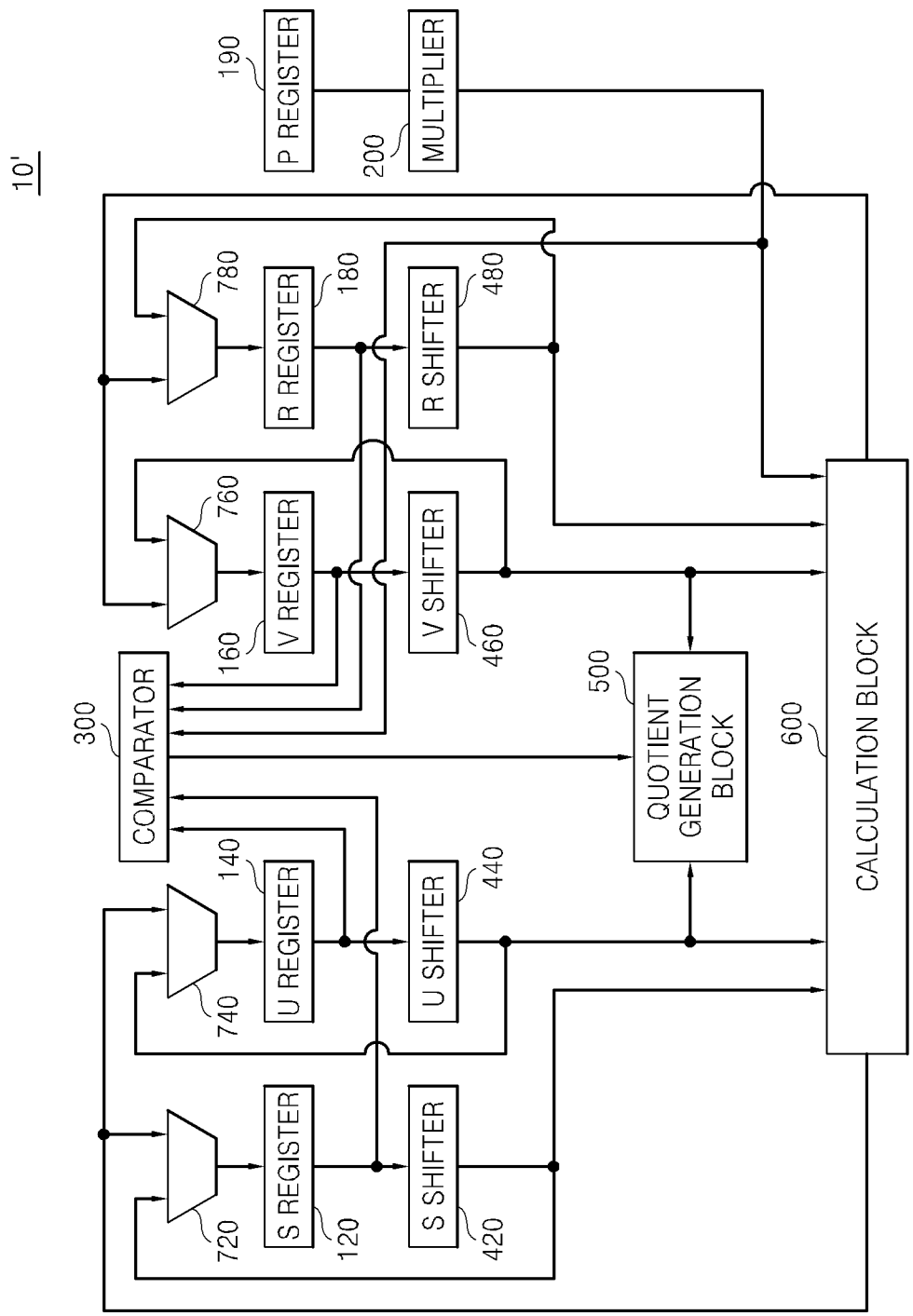
FIG. 3 is a block diagram of a Montgomery inverse calculation device according to other exemplary embodiment.

FIG. 3 is a block diagram of a Montgomery inverse calculation device 10' according to other exemplary embodiment. Referring to FIG. 3, the Montgomery inverse calculation device 10' further includes a plurality of selectors 720, 740, 760, and 780 as compared to the Montgomery inverse calculation device 10 illustrated in FIG. 1.

Each of the selectors 720, 740, 760, and 780 may output the output value of a corresponding one of the shifters 420, 440, 460, and 480 or an output value of the calculation block 600 to a corresponding one of the registers 120, 140, 160, and 180 in response to at least one fourth control signal among the plurality of control signals output from the comparator 300.

The selectors 720, 740, 760, and 780 include an S selector 720, a U selector 740, a V selector 760, and an R selector 780.

The S selector 720 outputs an updated value of the variable S to the S register 120 in response to the at least one fourth control signal. In other words, the S selector 720 may output the output value of the S shifter 420 or the output value of the calculation block 600 to the S register 120.

The U selector 740 outputs an updated value of the variable U to the U register 140 in response to the at least one fourth control signal. In other words, the U selector 740 may output the output value of the U shifter 440 or the output value of the calculation block 600 to the U register 140.

The V selector 760 outputs an updated value of the variable V to the V register 160 in response to the at least one fourth control signal. In other words, the V selector 760 may output the output value of the V shifter 460 or the output value of the calculation block 600 to the V register 160.

The R selector 780 outputs an updated value of the variable R to the R register 180 in response to the at least one fourth control signal. In other words, the R selector 780 may output the output value of the R shifter 480 or the output value of the calculation block 600 to the R register 180. The at least one fourth control signal includes information about an output value that will be output by each of the selectors 720, 740, 760, and 780.

Figure 4:
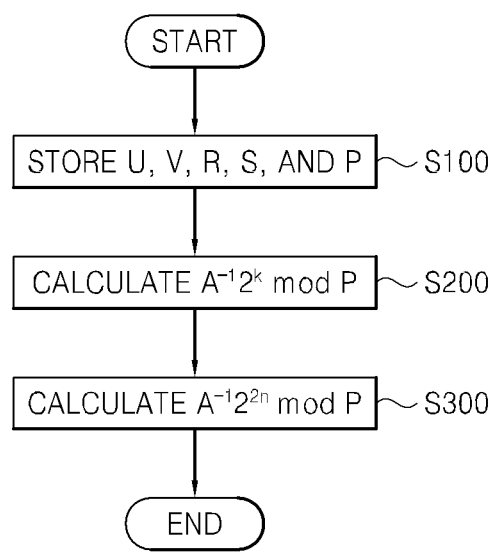
FIG. 4 is a flowchart of a method of calculating a Montgomery inverse using the Montgomery inverse calculation device illustrated in FIG. 1 or 3 according to some exemplary embodiments.

FIG. 4 is a flowchart of a method of calculating a Montgomery inverse using the Montgomery inverse calculation device 10 or 10' illustrated in FIG. 1 or 3 according to at least one exemplary embodiment of the present general inventive concept. The method includes storing the values of the respective variables S, U, V, and R, which are used in calculating the Montgomery inverse, in the registers 120, 140, 160, and 180, respectively, and a modulus P in a modulus register 190 in operation S100. Based on the values stored in the respective register, $A^{-1}2^k$ mod P, i.e., an inverse of "A" with respect to an integer "k", is calculated in operation S200. The integer "k" may be used as the exponent of the inverse. Accordingly, the integer "k" is corrected and a Montgomery inverse of "A", i.e., $A^{-1}2^{2n}$ mod P, is calculated in operation S300.

At this time, "A" is an integer, "P" is an odd number, and the A and P are co-prime. The integer "k" indicates a bit which is currently subjected to the calculation of the inverse of A in operation S200 and "n" is the number of bits of P expressed in binary notation. When the inverse of A with respect to the integer "k" is calculated in operation S200, the inverse may be calculated using a multi (e.g., m)-bit operation.

P may be a prime number. At this time, a Montgomery inverse calculation device and method according to the present general inventive concept may be used in elliptic curve cryptosystems.

The number P may also be the product of two prime numbers. At this time, the Montgomery inverse calculation device and method according to the present general inventive concept may be used in Rivest-Shamir-Adleman (RSA) cryptosystems. The two prime numbers correspond to secret information.

In storing the values of the respective variables S, U, V, and R in operation S100, P is stored as the value of the variable U, A is stored as the value of the variable V, 0 is stored as the value of the variable R, and 1 is stored as the value of the variable S.

In calculating the inverse of A with respect to the integer "k", i.e., in operation S200, when the value of the variable U can be divided by $2^m$, the value of the variable U stored in the U register 140 is updated with a result of dividing the value of the variable U by $2^m$, the value of the variable S stored in the S register 120 is updated with a result of multiplying the value of the variable S by $2^m$, and the integer "k" is increased by "m".

When the value of the variable U cannot be divided by $2^m$ but the value of the variable V may be divided by $2^m$, the value of the variable V stored in the V register 160 is updated with a result of dividing the value of the variable V by $2^m$, the value of the variable R stored in the R register 180 is updated with a result of multiplying the value of the variable R by $2^m$, and the integer "k" is increased by "m".

When the value of the variable U and the value of the variable V cannot be divided by $2^m$, the comparator 300 compares the absolute value of the variable U with the absolute value of the variable V. According to a result of the comparison, the value of each of the variables U, V, R, and S and the integer "k" are updated.

When it is found that the absolute value of the variable U is greater than the absolute value of the variable V as the comparison result, the value of the variable V stored in the V register 160, the value of the variable R stored in the R register 180, and the integer "k" are updated according to the number of consecutive 0s starting from the least significant bit of the binary value of the variable V.

Thereafter, the quotient "q" of mod $2^m$ with respect to the least significant digit (LSD) of the variable U and the LSD of the variable V is calculated using the quotient generation block 500.

The value of the variable U stored in the U register 140, the value of the variable R stored in the R register 180, and the value of the variable S stored in the S register 120 are updated using Equation 2:

$$U=(U-q*V)/2^m$$

$$R=R+q*S$$

$$S=2^m*S \quad (2)$$

Thereafter, modular reduction is performed on the value of the variable S and the value of the variable R using the calculation block 600. At this time, a result of the modular reduction may be limited to a value greater than $-2^m*P$ and less than $2^m*P$.

Operation S200 is repeated until the absolute value of the variable U or V is 1. During the update procedure, each of the variables U and V may have a negative value. With Equation 3 satisfied, the variables U, V, R, and S are updated:

$$U*S+V*R=P. \quad (3)$$

Two congruent expressions as shown in Equation 4 are obtained from Equation 3. Accordingly, each of the variables U, V, R, and S must satisfy Equation 4:

$$A*R=-U*2^k \bmod P$$

$$A*S=V*2^k \bmod P. \quad (4)$$

When it is found that the absolute value of the variable V is greater than the absolute value of the variable U as the comparison result, the value of the variable U stored in the U register 140, the value of the variable S stored in the S register 120, and the integer "k" are updated according to the number of consecutive 0s starting from the least significant bit of the binary value of the variable U.

Thereafter, the quotient "q" of mod $2^m$ with respect to the LSD of the variable V and the LSD of the variable U is calculated using the quotient generation block 500.

The value of the variable V stored in the V register 160, the value of the variable S stored in the S register 120, and the value of the variable R stored in the R register 180 are updated using Equation 5:

$$V=(V-q*U)/2^m$$

$$S=S+q*R$$

$$R=2^m*R \quad (5)$$

Consequently, the inverse of A with respect to "k", i.e., $A^{-1}2^k$ mod P is determined depending on the value of the variable U or V. In detail, when the value of the variable U is 1, the inverse of A with respect to "k", i.e., $A^{-1}2^k$ mod P is determined to be a value based on P−R. When the value of the variable U is −1, the inverse of A with respect to "k", i.e., $A^{-1}2^k$ mod P is determined to be the value of the variable R. When the value of the variable V is 1, the inverse of A with respect to "k", i.e., $A^{-1}2^k$ mod P is determined to be the value of the variable S. When the value of the variable V is −1, the inverse of A with respect to "k", i.e., $A^{-1}2^k$ mod P is determined based on P−S.

Hereinafter, the Montgomery inverse calculation device and method according to the present general inventive concept will be described in detail. In particular, in a Montgomery inverse algorithm hereinafter, "m" is 4. However, "m" may be a natural number greater than 2.

The Montgomery inverse algorithm includes a first algorithm and a second algorithm. The first algorithm receives the integer "A" and the modulus "P" and calculates the inverse of "A" with respect to "k", i.e. $A^{-1}2^k$ mod P. The second algorithm corrects the integer "k" used as the exponent of the inverse and calculates the Montgomery inverse of A, i.e. $A^{-1}2^{2n}$ mod P.

The first algorithm is as follows:

```
[Input]: A, P
[Output]:      A⁻¹2ᵏ mod P
U = P, V = A, R = 0, S = 1, k = 0
 1. while ((|U| != 1) && (|V| != 1)) do
 2.      if (U%16 = = 0) then
 3.           U = U/16; S = S*16; k = k+4;
 4.      else if ((V%16) = = 0) then
 5.           V = V/16; R = R*16; k = k+4;
 6.      else if (|U| > |V|) then
 7.           if (|V|%2 = = 1) then
 8.                k = k+4;
 9.           else if (|V|%4 = = 2) then
10.                V = V/2; R = 2R; k = k+5;
11.           else if (|V|%8 = = 4) then
12.                V = V/4; R = 4R; k = k+6;
13.           else if (|V|%16 = = 8) then
14.                V = V/8; R = 8R; k = k+7;
15.           q = QUOT(LSD_U, LSD_V);
16.           U = (U − q * V)/16;
17.           R = R + q * S;
18.           S = 16 * S;
19.      else if (|U| < |V|) then
20.           if (|U|%2 = = 1) then
21.                k = k+4;
22.           else if (|U|%4 = = 2) then
23.                U = U/2; S = 2S; k = k+5;
24.           else if (|U|%8 = = 4) then
25.                U = U/4; S = 4S; k = k+6;
26.           else if (|U|%16 = = 8) then
27.                U = U/8; S = 8S; k = k+7;
28.           q = QUOT(LSD_V, LSD_U);
29.           V = (V − q * U)/16;
30.           S = S + q * R;
31.           R = 16 * R;
32.      end if
33.      S = S mod P
34.      R = R mod P
35. end while
36. if (U = = 1) then return (D = P − R) and k
37. else if (U = = −1) then return (D = R) and k
38. else if (V = = 1) then return (D = S) and k
39. else if (V = = −1) then return (D = P − S) and k.
```

When A is 7451 and P is 7883, the calculation procedure of the first algorithm is shown in Table 1.

TABLE 1

| Operation | k | U | S | V | R | q |
|---|---|---|---|---|---|---|
| 1 | 0 | 7883 | 1 | 7451 | 0 | 0 |
| 2 | 4 | 27 | 16 | 7451 | 1 | 1 |
| 3 | 8 | 27 | 17 | 464 | 16 | 1 |
| 4 | 12 | 27 | 17 | 29 | 256 | 1 |
| 5 | 16 | 27 | 1809 | −10 | 4096 | 7 |
| 6 | 21 | 2 | 5295 | −5 | 2118 | 1 |
| 7 | 26 | 1 | 2356 | −1 | 2356 | 11 |

In the first operation in Table 1, "k" is defined as 0, the value of the variable "U" is defined as "P", the value of the variable "S" is defined as 1, the value of the variable V is defined as "A", and the value of the variable "R" is defined as 0. In other words, "P" is stored in the U register 140, 1 is stored in the S register 120, "A" is stored in the V register 160, and 0 is stored in the R register 180. In addition, "P" may be stored in the modulus register 190.

At this time, the comparator 300 may include a first internal counter. In this case, "k" may be stored in the first internal counter.

In the second operation in Table 1, the condition of row 1 in the first algorithm is satisfied. In other words, the absolute value of the variable U and the absolute value of the variable V are not 1. Accordingly, a procedure from row 2 to row 32 in the first algorithm is carried out. At this time, the absolute value of the variable U and the absolute value of the variable V are compared by the comparator 300.

The condition of row 6 in the first algorithm is satisfied. In other words, the absolute value of the variable U is greater than that of the variable V. Accordingly, a procedure from row 7 to row 18 in the first algorithm is carried out. At this time, the absolute value of the variable U and the absolute value of the variable V are compared by the comparator 300.

The value of the variable V satisfies the condition of row 7 in the first algorithm. Accordingly, "k" is increased by 4 and thus becomes 4 and a procedure from row 15 to row 18 in the first algorithm is carried out. According to row 15 in the first algorithm, the quotient "q" of mod 24 with respect to the LSD of the variable U and the LSD of the variable V is calculated. The quotient "q" is 1.

The QUOT function in the first algorithm calculates the quotient "q" using the following procedure. As an example, a procedure of calculating a quotient with respect to integers X and Y, i.e., QUOT(X, Y) will be described below.

Firstly, an inverse of mod $2^4$ with respect to the integer Y, i.e., $Y^{-1}$ is calculated. In other words, the quotient generation block 500 calculates $Y^{-1}$ in response to the second control signal. Various methods of calculating $Y^{-1}$ have already been known. A representative one of those methods is disclosed in the article written by O. Arazi and H. Qi ["On Calculating Multiplicative Inverses Modulo $2^{mn}$", IEEE Trans. Computers, Vol. 57, No. 10, pp. 1435-1438, October 2008].

The quotient "q" ($=X*Y^{-1}$ mod $2^4$) is calculated using $Y^{-1}$. In other words, the quotient generation block 500 may calculate the quotient "q".

The present general inventive concept does not restrict a method of calculating $Y^{-1}$.

A procedure from row 16 to row 18 in the first algorithm is carried out. The value of the variable U is updated with 27. In other words, the calculation block 600 calculates the updated value of the variable U in response to the at least one third control signal. The updated value of the variable U is stored in the U register 140 so that the value of the variable U is updated. In addition, the value of the variable R and the value of the variable S are updated through the same procedure as described above.

A procedure of rows 33 and 34 in the first algorithm is carried out. In other words, modular reduction is performed on the value of the variable S and the value of the variable R.

Since the value of the variable S is less than the modulus P, the value of the variable S is not changed even when the modular reduction is performed. The modular reduction is performed by the calculation block 600. In detail, the comparator 300 compares the value of the variable S with an output value (t*P, t∈{-15, -14, ..., 14, 15}) of the multiplier 200 and generates the at least one fourth control signal. The at least one fourth control signal includes information about the value of "t" used in performing the modular reduction.

The calculation block 600 performs the modular reduction in response to the at least one fourth control signal. In other words, the calculation block 600 calculates "S−t*P". Here, "t" is 0. The value of the variable S obtained as a result of the modular reduction is stored in the S register 120 so that the value of the variable S is updated. Through the same procedure, the value of the variable R is updated.

The third through seventh operations in Table 1 are similar the second operation. Thus, detailed descriptions thereof will be omitted.

As a result of the seventh operation, the value of the variable U is 1. Therefore, the inverse of "A" with respect to "k" i.e., ($A^{-1}2^k$ mod P) is determined as P−R, and "k" is 26 according to row 36 in the first algorithm.

A result of performing the first algorithm is confirmed to be correct when Equation 6 is satisfied:

$$A*(P-R)=2^{26} \text{ mod } 7883. \quad (6)$$

A result of modular multiplication on the left side of Equation 6 is expressed by Equation 7:

$$7451*5527=885 \text{ mod } 7883. \quad (7)$$

A result of multiplication on the right side of Equation 6 is expressed by Equation 8:

$$2^{26}=885 \text{ mod } 7883. \quad (8)$$

When Equation 7 and Equation 8 are compared with each other, it may be inferred that Equation 6 is approved.

The second algorithm is as follows:

```
[Input]:  D = A⁻¹2ᵏ mod P, k from Phase 1, and n
[Output]: X = A⁻¹2²ⁿ mod P
  1. If k < 2n
  2.      j = 2n−k
  3.      While j > 0
  4.          If j = 1 then D = 2D, j = j−1
  5.          Else D = 4D, j = j−2
  6.              If D > 3P then D = D−3P
  7.              Else if D > 2P then D = D−2P
  8.              Else if D > P then D = D−P
  9. Else
 10.      f = (k−2n) mod 4      // r ∈ {0, 1, 2, 3}
 11.      e = (k−2n−r)/4
 12.      For i = 1 to e
 13.          q = QUOT (LSD_D, LSD_P)
 14.          D = (D−qP)/16
 15.      For i = 1 to f
 16.          If D%2 == 0 then D = D/2
 17.          Else D = (D+P)/2
 18. Return X = D.
```

In the second algorithm, two different types of calculation are carried out according to the value of "k". In a procedure from row 1 to row 8 in the second algorithm, the exponent of 2 forming D is corrected in units of 2 bits.

In a procedure from row 9 to row 17 in the second algorithm, the exponent of 2 forming D is corrected in units of 4 bits. To perform the second algorithm, the result of the first algorithm, i.e., D is stored in the U register 140 and the modulus P is stored in the V register 160.

The comparator 300 compares the integer "k" with 2*n. When "k" is less than 2*n as a result of comparison, a procedure from row 2 to row 8 in the second algorithm is carried out.

A procedure of row 2 in the second algorithm is carried out. In other words, a value of 2*n−k is stored in a second internal counter included in the comparator 300 to store a value of "j".

When "j" is greater than 1, a procedure from row 4 to row 8 in the second algorithm is repeated. When "j" is 1, the U shifter 440 shifts a value stored in the U register 140 to the left by 1 bit and an output value of the U shifter 440 is stored in the U register 140. As a result, the value stored in the U register 140 is updated. The value of "j" is decreased by 1.

When "j" is not 1, the U shifter 440 shifts a value stored in the U register 140 to the left by 2 bits and an output value of the U shifter 440 is stored in the U register 140. As a result, the value stored in the U register 140 is updated. The value of "j" is decreased by 2.

Thereafter, a procedure from row 6 to row 8 in the second algorithm is carried out.

The calculation block 600 calculates U−3*V and then transmits a sign signal to the comparator 300 based on a result of the calculation. The sign signal includes information about a sign of a value of the calculation result. The comparator 300 checks the sign signal and updates the value stored in the U register 140 with the value of the calculation result when the value of the calculation result is a positive number.

When the value of the calculation result is a negative number, the calculation block 600 calculates U−2*V and then transmits a sign signal to the comparator 300 based on a result of the calculation. The comparator 300 checks the sign signal and updates the value stored in the U register 140 with a value of the calculation result when the value of the calculation result is a positive number.

When the value of the calculation result is a negative number, the calculation block 600 calculates U−V and then transmits a sign signal to the comparator 300 based on a result of the calculation. The comparator 300 checks the sign signal and updates the value stored in the U register 140 with a value of the calculation result when the value of the calculation result is a positive number.

A procedure from row 10 to row 17 in the second algorithm is carried out when "k" is not less than 2*n. The comparator 300 may also include an f register and an e register.

The calculation block 600 calculates k−2*n. Lower two bits of a value of k−2*n is stored in the f register and the remaining bits other than the lower two bits in the value of k−2*n are stored in the e register. D is stored in the U register 140 and P is stored in the V register 160.

The inverse calculator 520 calculates $P^{-1}$ mod $2^k$. The quotient generator 540 obtains the quotient "q" using an output value of the inverse calculator 520. The calculation block 600 calculates (U−q*V)/16. An output value of the calculation block 600 is stored in the U register 140 so that the value of the variable U is updated. The above procedure is repeated as many times as a value of "e".

When the value stored in the U register 140 is an even number, the U shifter 440 shifts the value stored in the U register 140 to the right by 1 bit and an output value of the U shifter 440 is stored in the U register. When the value stored in the U register 140 is an odd number, the calculation block 600 adds P to the value stored in the U register 140. An output value of the calculation block 600 is stored in the U register 140. The U shifter 440 shifts the value stored in the U register 140 to the right by 1 bit and an output value of the U shifter 440 is stored in the U register 140. The above procedure is repeated as many times as a value of "f".

As described above, according to at least one exemplary embodiment of the present general inventive concept, a Montgomery inverse calculation device and method perform a shift operation and a modular reduction operation on multiple bits at a time to calculate a Montgomery inverse. Accordingly, the amount of time taken to calculate the Montgomery inverse may be reduced.

The present general inventive concept can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few exemplary embodiments of the present general inventive concept have been shown and described, it will be appreciated by those skilled in the art that changes may be made in these exemplary embodiments without departing from the principles and spirit of the general inventive concept, the scope of which is defined in the appended claims and their equivalents.

What is claimed is:

1. A Montgomery inverse calculation device comprising:
   a plurality of registers each configured to receive and store a value of a variable as input values, the input values comprising at least two co-prime integers used to calculate the Montgomery inverse;
   a modulus register configured to store a modulus;
   a multiplier configured to perform multiplication on the modulus;
   a comparator configured to compare the value of the variable stored in each of the registers with an output value of the multiplier and to generate a plurality of control signals;
   a plurality of shifters each configured to shift bits of a value of a variable stored in a corresponding register among the registers in response to at least one first control signal among the control signals;
   a quotient generation block configured to calculate a quotient of mod $2^m$ with respect to values output from some of the shifters in response to a second control signal among the control signals where "m" is at least one of a number 2 and a natural number greater than 2; and
   a calculation block configured to calculate an updated value of an output value of each of the shifters using the quotient in response to at least one third control signal among the control signals.

2. The Montgomery inverse calculation device of claim 1, wherein the quotient generation block comprises:
   an inverse calculator configured to calculate an inverse of mod $2^m$ of values stored in some of the plurality of registers in response to the second control signal; and
   a quotient generator configured to calculate the quotient using the inverse of mod $2^m$.

3. The Montgomery inverse calculation device of claim 2, wherein "m" is 4.

4. The Montgomery inverse calculation device of claim 2, wherein each of the shifters performs a shift by at least one bit.

5. The Montgomery inverse calculation device of claim 2, wherein the calculation block performs modular reduction on at least one value among output values of the respective shifters.

6. The Montgomery inverse calculation device of claim 2, further comprising a plurality of selectors each configured to output at least one of an output value of a corresponding shifter among the shifters and an output value of the calculation block to a corresponding register among the registers.

* * * * *